March 1, 1966  N. D. LANDQVIST  3,237,720
CLIMBING APPARATUS
Filed April 13, 1964  2 Sheets-Sheet 1

March 1, 1966  N. D. LANDQVIST  3,237,720
CLIMBING APPARATUS
Filed April 13, 1964  2 Sheets-Sheet 2

3,237,720
CLIMBING APPARATUS
Nils D. Landqvist, Karskar, Gavle, Sweden, assignor to Ab Partner, Molndal, Sweden
Filed Apr. 13, 1964, Ser. No. 359,089
Claims priority, application Sweden, Apr., 19, 1963, 4,324/63
3 Claims. (Cl. 182—133)

The invention relates to a machine for advancing working and processing means over the surface of longish objects substantially circular in cross section, such as poles, tubes and tree-trunks.

Climbing machines for debranching and debarking of unfelled trees are already known. A particular type of machine to which the invention especially refers, moves in a helical path around the trunk, whereby the debranching tool may be mounted stationary on the frame of the machine. The purpose of the invention is to provide a simple and effective climbing machine which is generically useful for advancing working and processing means of various kinds over the surface of any cylindrical or slightly tapering longish object, irrespective of a vertical, horizontal or inclined position of said object.

According to the invention, the machine comprises a motor driven carriage having wheels adapted to be supported by and to run over the surface of said object. Two rotatable means such as pulleys or sprocket wheels are mounted on the carriage in spaced relation transversely of the direction of movement to rotate with clearance in relation to said supporting surface, and a flexible endless member, such as a belt, wire or chain, is provided to pass over said rotatable means. One part of the flexible endless member is adapted to be put in at least one helical loop around the object to be treated, while an opposite part is permitted to depend freely between the rotatable means. Power transmitting means connect one of said rotatable means to the motor, and braking means are arranged to engage the non-driven rotatable means to keep the helical loop of the flexible endless member under a desired tension. Further, the running wheels of the carriage are directed in parallel to said helical loop, whereby the carriage is movable along the path defined by said loop.

In a preferred embodiment the flexible endless member consists of a chain which is laid over sprocket wheels, and in the following only this embodiment will be discussed, though it is obvious that also an endless belt, a rope or a wire may be used in connection with pulleys adapted therefor.

In the operation of this machine, the driven sprocket wheel causes the carriage to advance along the helical chain loop in such a way that the loop is continuously shortened at one end and is lengthened correspondingly at the other end. In dependence on the direction of movement of the carriage the loop will thus change its position progressively in either direction along the axis of the supporting object, so that the carriage can continue to move in its helical path. The braking force acting upon the non-driven sprocket wheel must be adapted such that the chain loop is under tension securely held in its position and thereby reliably supports the carriage when the tools mounted thereon are to perform their operations.

When the machine is arranged to climb up an unfelled tree, it must be provided to reverse the direction of movement automatically, before it reaches the top of the tree. For that purpose, the carriage may carry a member which senses the thickness of the tree to reverse the driving means at a predetermined diameter of the tree. In a preferred embodiment, both sprocket wheels are provided with braking means, and the driving connection, preferably a reduction gear, is mounted to connect selectively either of the sprocket wheels to the motor, the non-driven sprocket wheel being simultaneously engaged by its braking means. During the upward movement of the carriage it is to prefer to drive the lower sprocket wheel, while the other sprocket wheel may be driven during the movement downwards.

The invention will be further described with reference to the accompanying drawings which show an embodiment diagrammatically. It may be noted that the tools to be carried by the machine are omitted as they have nothing to do with the conveying machine.

Figure 1:
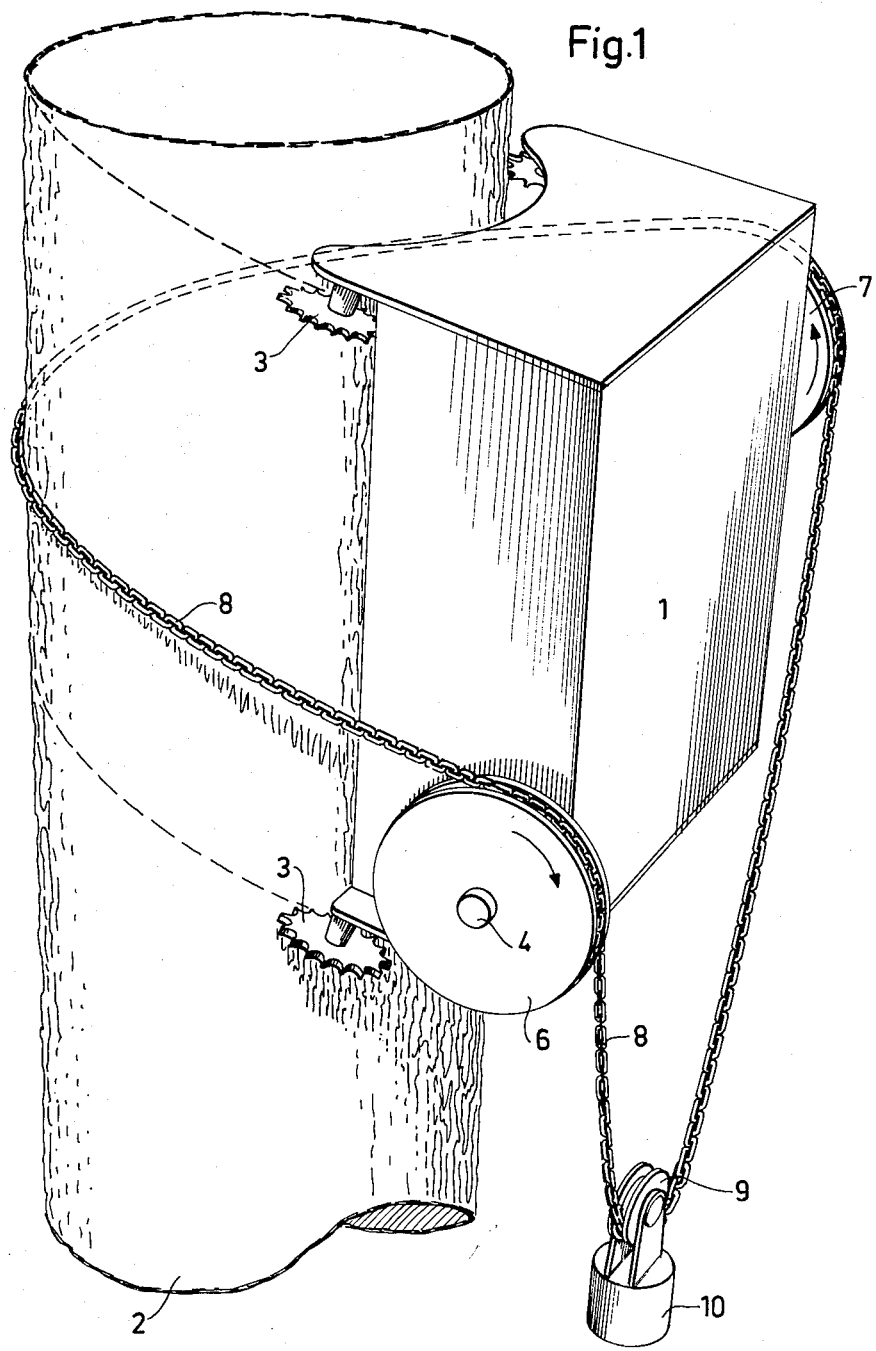
FIGURE 1 shows a perspective view of the machine hung up on a tree trunk.

The machine in FIG. 1 comprises a box-shaped carriage 1 enclosing a driving motor and a reduction gear. The carriage rests against the tree-trunk 2 by means of four wheels 3 mounted at the corners of the rectangular carriage side turned to the trunk. The wheels are parallel to each other but are directed a little obliquely in relation to the horizontal sides of the carriage. In the embodiment shown, the wheels 3 are toothed to engage the trunk with security, but they may also be knurled or coated with a frictional ring of rubber, for instance.

Two horizontal shafts 4 and 5 (FIG. 2) are mounted at different height within the carriage 1 in parallel to the common plane of the wheels 3. The shafts project each through one of two opposite vertical sides of the carriage, and the projecting shaft ends carry sprocket wheels 6 and 7 respectively secured thereto. An endless chain 8 is laid over the sprocket wheels 6, 7 and extends in a loop around the trunk 2. At the opposite side of the wheels 6, 7 the chain 8 forms a freely depending loop, the length of which varies in dependence on the thickness of the trunk. If necessary, a pulley 9 carrying a weight 10 may be suspended in said free chain loop to keep it stretched, but in many cases the engagement between the chain 8 and the wheels 6, 7 is quite sufficient also in the absence of such a weight. To make possible the mounting shown in FIG. 1, the chain 8 must, of course, include two links which are easily to disassemble and reassemble.

The chain 8 extends around the trunk 2 along a screw line, the pitch of which is determined by the difference in level of the sprocket wheels 6, 7. The running wheels 3 of the carriage are adjusted in such an inclination that they roll along screw lines in parallel to the chain loop. In dependence on the direction of rotation of the driven sprocket wheel the carriage will thus move in a helical path up or down the trunk. If the lower sprocket wheel 6 is driven clockwise, as shown in FIG. 1, the carriage will move upwards. By a simultaneous braking of the upper sprocket wheel 7 the chain loop is kept stretched sufficiently to retain the carriage on the surface of the trunk. Preferably the braking force is adjustable.

Figure 2:
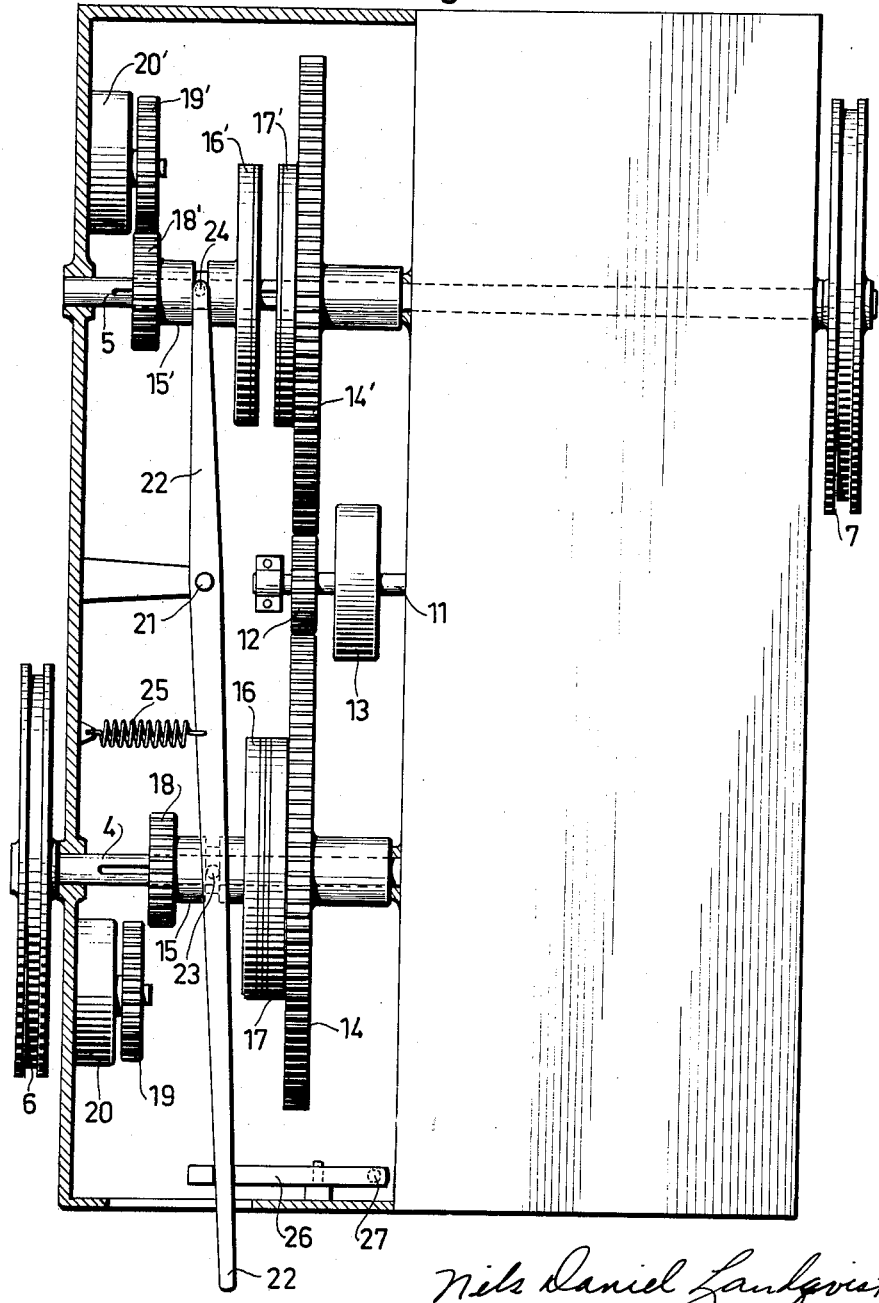
FIGURE 2 shows, in a vertical section, an embodiment of a gear box designed to reverse the movement automatically.

The reversible reduction gear shown in a simplified form in FIG. 2 has for its purpose only to present, as a principle, a possible embodiment of the drive transmission of the carriage. An explosion motor (not shown) enclosed in a separate compartment has its drive shaft 11 connected to a pinion 12 over a centrifugal clutch 13 of the known type which is kept disconnected at low numbers of revolutions but is connected when the number of revolutions is increased by actuation of the gas throttle. The pinion 12 is permanently in engagement with two large gear wheels 14 and 14' rotatably journalled on the sprocket wheel shafts 4 and 5 respectively. Besides, each of the shafts 4, 5 carries a sleeve 15 and 15' respectively, which is movable axially but secured against rotation in relation to its shaft. The sleeve end turned to the gear wheel 14 or 14' has fixed to its a clutch disk 16 and 16' respectively which is adapted to cooperate with a similar clutch disk 17 and 17' respectively fixed to the adjacent side of the gear wheel. The opposite end of each of the sleeves 15 and 15' supports a minor gear wheel 18 and 18' respectively which is inoperative when the clutch is connected. When the sleeve 15 or 15' is moved to disconnect the clutch, its gear 18 or 18' meshes with a gear wheel 19 and 19' respectively on a shaft which is in a known manner braked permanently within a brake drum 20 and 20' respectively. The braking mechanism may be of any performance but its braking force must preferably be easily adjustable.

A double-armed lever 22 is mounted on a pivot 21. At equal distances from the pivot 21 the two lever arms are linked (at 23 and 24) to the sleeves 15 and 15' respectively which are thereby moved in opposite directions when the lever is turned. In the position shown in FIG. 2, the clutch disks 16, 17 are thus connected to permit the motor to drive the sprocket wheel 6, and at the same time the movable gear 18' meshes with the braked gear 19' to brake the sprocket wheel 7. A tension spring 25 inserted between the lever 22 and the wall of the casing acts to swing the lever 22 clockwise so that the sleeves 15, 15' with the clutch disks 16, 16' and the gears 18, 18' are moved to their opposite positions in which the sprocket wheel 7 is instead connected to the motor, while the sprocket wheel 6 is braked. However, the lever 22 is retained in the position shown by a pawl 26 mounted to pivot in a plane perpendicular to that of the drawing. A member 27 arranged to sense the thickness of the trunk is provided to turn the pawl 26 against the action of a spring (not shown) so that the lever 22 is released.

The sensing member 27 which is not shown in detail, may consist of a rod projecting from the carriage 1 onto the trunk 2 between the two lower wheels 3 and movable inwardly against the action of a spring. The outer end of the rod 27 may carry a roller adapted to roll on the trunk, when the carriage advances, and the inner end of the rod 27 is adapted to act upon the pawl 26 in the manner indicated above. When the carriage moves up a trunk, the sensing rod 27 is progressively moved inwards to the extent the running wheels 3, owing to the decreased diameter of the trunk, grasp a greater angular sector, and the intermediate part of the carriage 1 thus approaches the surface of the trunk. Of course, the mechanism is dimensioned to release the pawl 26 at a desired thickness of the trunk. The lower end of the lever 22 projects through a slot in the casing so that the lever may be returned into the blocked position in FIG. 2 by manual operation.

When the machine described has been mounted as shown in FIG. 1, the gear mechanism has been set in the position in FIG. 2, and the motor has been started to run freely, the gas throttle is opened to full speed, whereby the centrifugal clutch 13 connects the gear mechanism and the sprocket wheel 6 pulls the carriage upwards in a helical path, as mentioned above. The direction of rotation of the sprocket wheels during this upward movement is indicated by arrows in FIG. 1. When the carriage has arrived at a trunk portion of the thickness for which the sensing member 27 is adjusted, the pawl 26 is caused to release the lever 22 so that the gear mechanism is reversed. The carriage moves now downwards along the same helical path as before.

To prevent an unintentional release of the lever 22 when the sensing member 27 passes over a local protuberance on the trunk, it may be to prefer to provide two separate sensing members placed at different levels and each adapted to actuate one pawl mounted to cooperate with the lever. The function may then be such that the lever 22 is released only when the two pawls are manipulated simultaneously.

The machine described above and shown in the drawings can be modified in several respects within the scope of the invention. As an example, the distance between the pairs of running wheels may be adjustable so that a machine can be advanced on cylindrical surfaces of essentially different diameters. For the rest, the number of wheels may be another, such as three, for instance. As already mentioned, the chain or belt may be formed with spikes or prongs adapted to engage the supporting surface.

Though not shown, the machine is adapted to carry various working tools or apparatuses. As mentioned, an outstanding range of application is debranching of unfelled trees. A debranching apparatus may consist of a motor driven chain saw of the type used for the manual felling of trees, through preferably of minor dimensions. The chain saw may then be mounted to extend upwards from the top of the carriage close to the trunk with its teeth directed tangentially of the trunk. The carriage and the saw may be driven by a common motor. According to another proposal, a motor driven cutter spindle may be used as a debranching tool.

The machine is also useful for painting or other surface treatments of cylindrical objects such as oil cisterns and, to especial advantage, long pipe lines. For upright cylinders the reversing mechanism is not useful, but in this case it might be possible to manipulate the machine by means of a depending wire. A spray painting is preferably carried out above the carriage during the movement downwards so that the painted surface is not disturbed by the chain. When painting horizontal pipe lines a reversing mechanism is not necessary, but the machine must only be lifted over flanges and other obstructions on the line. It is obvious that the ranges of application indicated are only to be considered as examples which is no way constitute a limitation.

What I claim is:

1. A machine for advancing working and processing means in a helical path over the surface of longish objects substantially circular in cross section, comprising a motor driven carriage having wheels adapted to be supported by and to run over said surface, two rotatable means mounted on the carriage in spaced relation transversely of the direction of movement and adapted to rotate with clearance in relation to said supported surface, a flexible endless member passing over said rotatable means, one part of said member being adapted to be put in at least one helical loop around the object to be treated, while an opposite part is permitted to depend freely between the rotatable means, power transmitting means connecting one of said rotatable means to the motor and braking means arranged to engage the non-driven rotatable means to keep the helical loop of the flexible endless member under a desired tension, the running wheels of the carriage being directed in parallel to said helical loop, whereby the carriage is movable along the path defined by said loop.

2. A machine for advancing working and processing means in a helical path over the surface of longish objects substantially circular in cross section, comprising a motor-driven carriage having wheels adapted to be supported by and to run over said surface, two rotatable means mounted on the carriage in spaced relation transversely of the direction of movement and adapted to rotate with clearance in relation to said supporting surface, a flexible endless member passing over said rotatable means, one part of said member being adapted to be put in at least one helical loop around the object to be treated, while an opposite part is permitted to depend freely as a loop between the rotatable means, power transmitting means, preferably a reduction gear, mounted to connect selectively either of the rotatable means to the motor, braking means provided for both rotatable means and arranged to release the rotatable means connected to the motor, while the non-driven rotatable means is simultaneously engaged by its braking means to keep the helical loop of the flexible endless member under a desired tension, the running wheels of the carriage being directed in parallel to said helical loop, whereby the carriage is movable along the path defined by said loop.

3. A machine as claimed in claim 2, wherein a weight is suspended by a roller in the freely depending loop of the flexible endless member.

References Cited by the Examiner

UNITED STATES PATENTS

| 742,447 | 10/1903 | Kidder | 182—133 |
| 860,359 | 7/1907 | Dudley | 182—133 |
| 1,299,289 | 4/1919 | Berg | 182—133 |

HARRISON R. MOSELEY, *Primary Examiner.*

REINALDO P. MACHADO, *Examiner.*